Feb. 21, 1933.  W. C. MARTIN  1,898,638
AIRCRAFT
Filed Oct. 30, 1930  2 Sheets-Sheet 1

Inventor
W. C. Martin
By Frease and Bishop
Attorneys

Feb. 21, 1933.  W. C. MARTIN  1,898,638
AIRCRAFT
Filed Oct. 30, 1930  2 Sheets-Sheet 2

Inventor
W. C. Martin
By Frease and Bishop
Attorneys

Patented Feb. 21, 1933

1,898,638

UNITED STATES PATENT OFFICE

WILLIAM C. MARTIN, OF WAYNESBURG, OHIO

AIRCRAFT

Application filed October 30, 1930. Serial No. 492,150.

My invention relates to aircraft, and more particularly to aircraft in which flying thrust as well as lift is attained by the use of a rotor rotating about an axis extending laterally of the longitudinal axis of the aircraft.

The objects of the present invention include the provision of an aircraft including a rotor providing flying thrust and lift, and operatively mounted for rotation about an axis extending laterally of the longitudinal axis of the aircraft, whereby unit pressures on the rotor may be materially decreased as compared with unit pressures on the usual propeller, whereby a relatively slow landing speed may be attained, and whereby the aerodynamic action of the aircraft as a whole is improved as compared with usual forms of aircraft.

The foregoing and other objects are attained by the aircraft, structure, parts, improvements, and combinations which comprise the present invention, and which are particularly and distinctly pointed out and set forth in the appended claims forming part hereof.

In general terms the improved aircraft of the present invention includes an air re-acting rotor operatively mounted thereon for rotating about an axis extending laterally of the longitudinal axis of the aircraft, power means for driving the rotor and power rotation of the rotor providing flying thrust for the aircraft, a lifting airfoil located in the zone of action of the rotor, and means for varying the aerodynamic action of the rotor.

Figure 3:
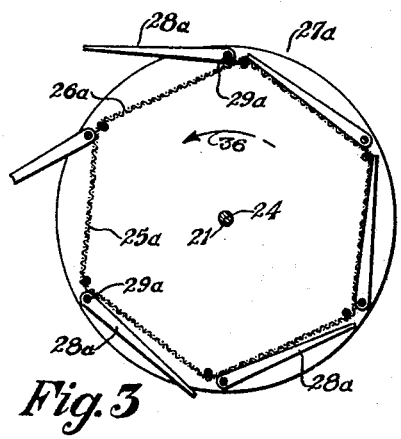
Figure 2:
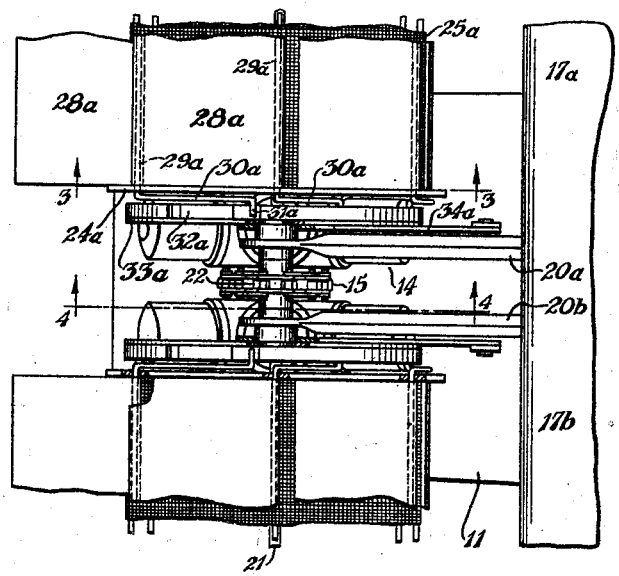
Figure 1:
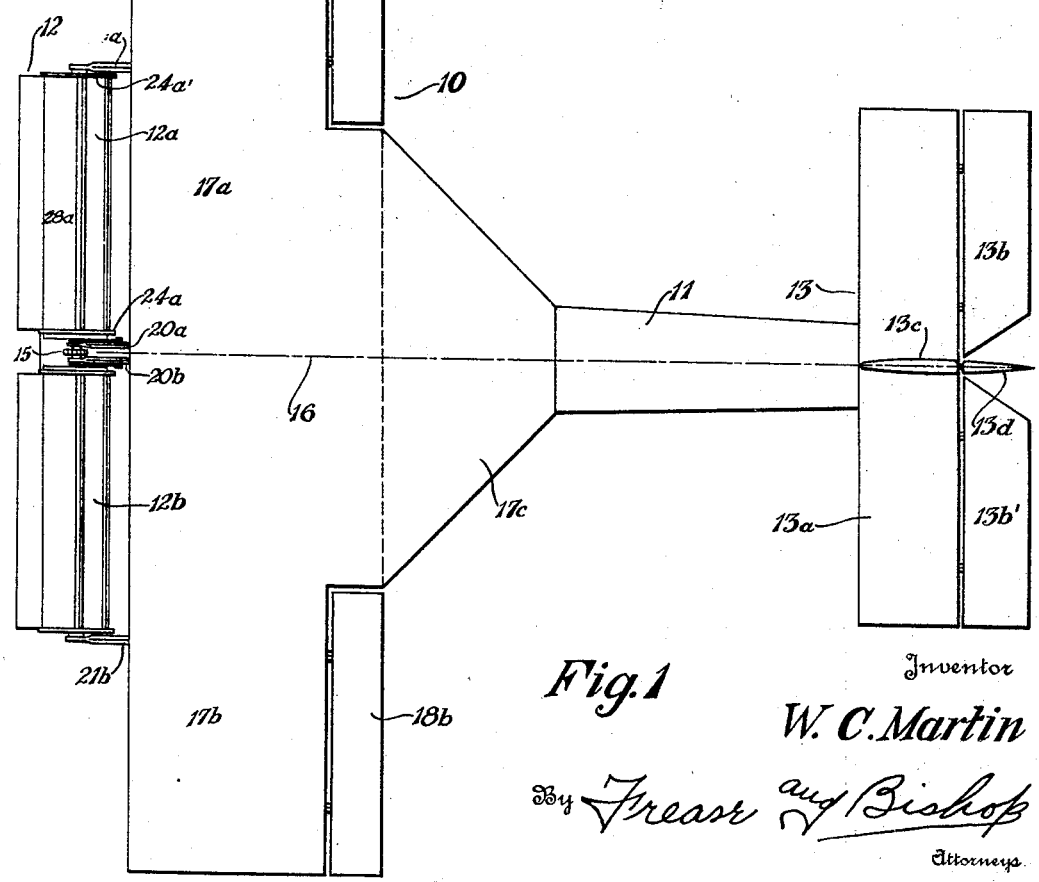
Figure 5:
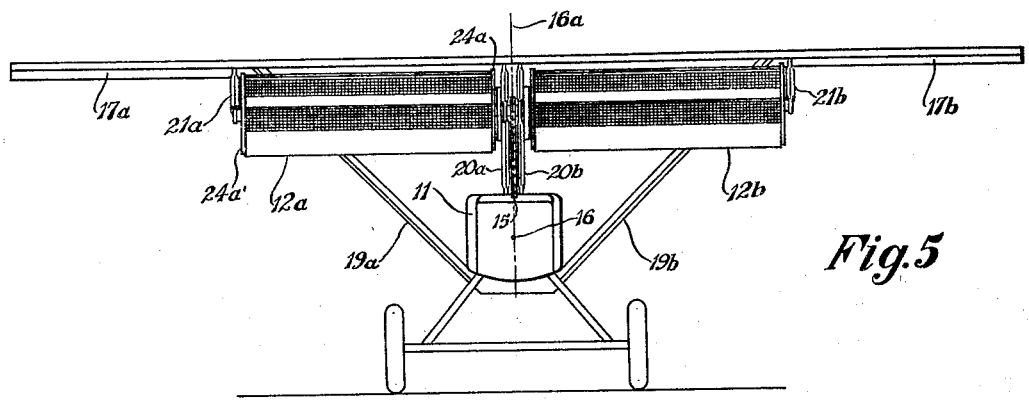
Figure 4:
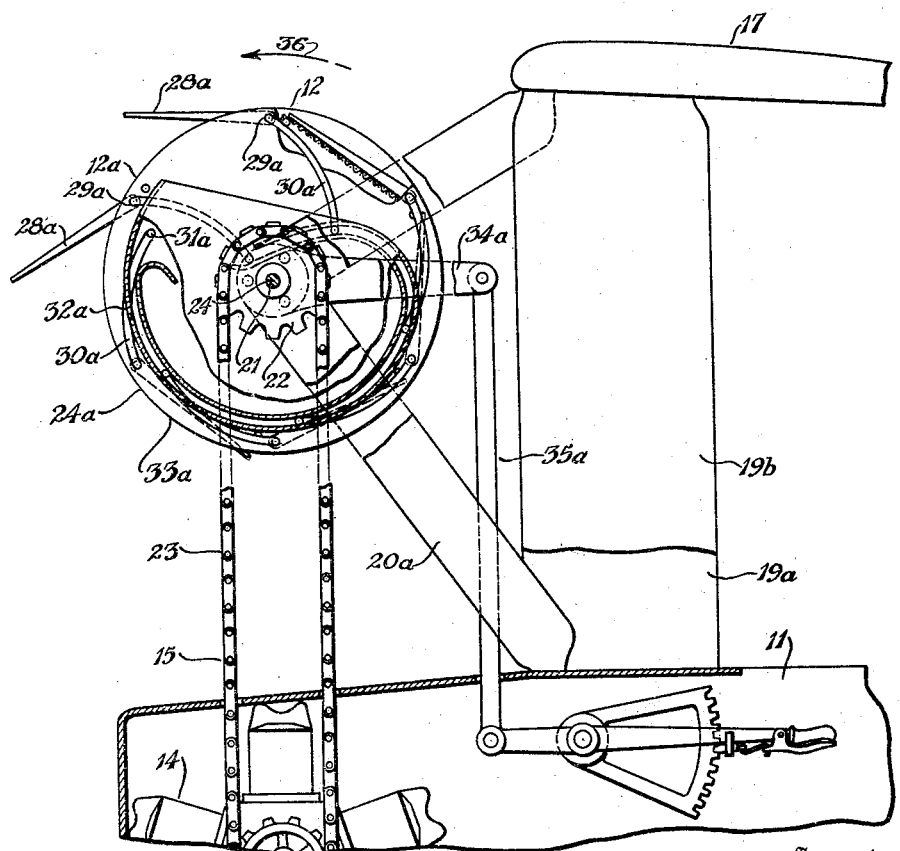

A preferred embodiment of the invention is illustrated in the accompanying drawings forming part hereof, in which Figure 1 is a top plan view of an aircraft embodying the present improvements;

Fig. 2, an enlarged fragmentary view similar to Fig. 1 illustrating details of construction;

Fig. 3, a detached sectional view of one of the rotors thereof as on line 3—3, Fig. 2;

Fig. 4, a fragmentary sectional view of the improved aircraft as on line 4—4, Fig. 2; and Fig. 5, a front elevation thereof.

Similar numerals refer to similar parts throughout the several views.

The improved aircraft is indicated generally at 10 and as illustrated is generally of a monoplane type of heavier than aircraft, although the present invention may be applied to other types of heavier than aircraft, and the rotor of the present invention may be applied to lighter than aircraft.

The improved monoplane 10 includes a fuselage 11 at the forward end of which is operatively mounted an improved air re-acting rotor indicated generally at 12, as will hereinafter be described in detail.

A tail structure indicated generally at 13 is mounted at the rear end of the fuselage, and may be of any usual form, and may include a horizontal stabilizer plane 13a, elevators 13b and 13b', a vertical stabilizer 13c, and a rudder 13d.

An engine indicated generally at 14 is mounted at the forward end of the fuselage, and the engine may be controlled in the usual manner, and rotates the rotor 12 as by means of a sprocket and chain connection indicated generally by 15.

The longitudinal axis of the aircraft is indicated by a dot-dash line 16 and is also the longitudinal axis of the fuselage 11.

A lifting airfoil indicated generally by 17 is located in the zone of action of the rotor 12, and preferably comprises one wing portion 17a extending laterally from one side of the longitudinal axis 16, and another wing portion 17b extending laterally from the other side of the longitudinal axis 16; and an aileron 18a is operatively mounted in the usual manner at the trailing edge of the lifting wing portion 17a, while an aileron 18b is operatively mounted in a usual manner at the trailing edge of the lifting plane portion 17b.

For increasing the aerodynamic effectiveness of the improved aircraft as a whole, the lifting wing 17a preferably includes a rearwardly extending central trapezoidal portion 17c.

The control planes, that is the elevators 13b and 13b', the rudder 13d, and the ailerons 18a and 18b are operatively connected in the usual manner not shown, with a control stick and rudder assembly not shown located in the fuselage, and the engine is provided with suitable controls not shown.

The lifting airfoil 17 is preferably located above the fuselage 11, and supported and connected at the upper ends of strut and airfoil members 19a and 19b whose lower ends are connected at opposite sides on the fuselage 11; and the members 19a and 19b slope upwardly and outwardly therefrom, in order to attain stability according to the principles set forth in the patent of William H. Martin, No. 935,384, issued September 28, 1909.

The rotor 12 is operatively mounted on the aircraft in front of and below the lifting airfoil, as by means of V struts 20a and 20b and end supports 21a and 21b.

The V struts 20a and 20b are symmetrically spaced on opposite sides of the longitudinal axial plane 16a of the aircraft, and are connected at their upper ends with the airfoil 17 and at their lower ends with the fuselage 11.

The rotor 12 includes a shaft 21 which is journalled in the struts 20a and 20b and in the end supports 21a and 21b.

Between the struts 20a and 20b, a sprocket 22 is keyed to the shaft and the sprocket is provided with a driving connection with the motor 14 by means of a chain 23.

The axis 24 of the shaft 21 coincides with the axis of the rotor as a whole and extends laterally from opposite sides of the longitudinal axis 16 of the aircraft.

The rotor 12 as illustrated includes a rotor unit 12a at one side of the longitudinal axis 16 of the aircraft, and a unit 12b at the other side of the axis 16.

The rotor unit 12a includes disks 24a and 24a' secured to the shaft 21; and a preferably polygonal shell 25a extends and is secured between the disks 24a and 24a'; and the shell 25a has formed on its outer face a plurality of air reacting plane surfaces 26a.

The shaft 21, the disks 24a and 24a', and the shell 25a comprise a rotating mounting member indicated generally by 27a, and having formed thereon a plurality of outer air reacting surfaces 26a, and on the outside of each air reacting surface, an airfoil 28a is operatively mounted on the mounting member for oscillating movement towards and away from the opposite air reacting surface 26a during rotation of the rotor.

For this purpose, each airfoil 28a is secured adjacent its trailing edge on a shaft 29a which is journalled at opposite ends in the disks 24a and 24a', and the shaft 29a extends through the disk 24a', and a crank arm 30a extends from each shaft 29a on the outside of the disk 24a' and terminates in its outer end in a cam follower member 31a which extends from the crank arm 30a towards the longitudinal axial plane 16a for engagement during rotation of the rotor 12 with a cam guide 32a which is formed in a cam plate 33a adjustably mounted on the shaft 21 between the disk 24a' and the V strut 20a.

The cam guide 32a cooperates with each cam following member 31a to oscillate each airfoil 28a to and from its opposite air reacting surface 26a during rotation of the rotor.

An adjusting arm 34a is secured upon the cam plate 33a and is provided with link means indicated generally by 35a whereby the timing of the oscillations of the airfoils 28a may be varied.

As illustrated, the airfoils 28a open with respect to the opposite air reacting surface 26a as the airfoils 28a reach their extreme uppermost position illustrated in Fig. 3, the rotor rotating in the direction of the arrow 36.

The airfoils continue opening and then close during downward movement thereof, and the final closing action is very rapid and serves to compress the air between the particular airfoil 28a and the opposite air reacting surface 26a, building up a pressure and causing flow of high pressure air towards the underside of the lifting airfoil 17.

The opening of the airfoils 28a with respect to the air reacting surface 26a at the top of their rotary travel also serves to decrease the pressure above and in front of the lifting plane 17.

The rotor unit 12b is similar in construction to the rotor unit 12a and will not be described in further detail.

By the use of the power driven rotor 12 and preferably by the use of the oscillating airfoils 28a thereon, flying thrust as well as lift is provided for the aircraft, unit air pressures on all surfaces are reduced, and no high speed propeller is necessary.

I claim:

1. An aircraft including an air reacting rotor operatively mounted thereon for rotating about an axis extending laterally of the longitudinal axis of the aircraft, and the rotor including a rotating mounting member, a shell on the mounting member, and a plurality of airfoils normally spaced substantially flat against the shell and mounted on the mounting member for movement away from the shell and extending parallel with the axis of rotation of the rotor.

2. An aircraft including an air reacting rotor operatively mounted thereon for rotating about an axis extending laterally of the longitudinal axis of the aircraft, and the rotor including a rotating mounting member, a shell on the mounting member, and a plurality of airfoils normally spaced substantially flat against the shell and mounted on the mounting member for movement away from the shell and extending parallel with the axis of rotation of the rotor, and a lifting airfoil located in the zone of action of the rotor.

3. An aircraft including an air reacting rotor operatively mounted thereon for rotating about an axis extending laterally of the longitudinal axis of the aircraft, power means for driving the rotor, power rotation of the rotor providing flying thrust for the aircraft, and a lifting airfoil including a trapezoidal portion located in the zone of action of the rotor.

4. An aircraft including an air reacting rotor operatively mounted thereon for rotating about an axis extending laterally of the longitudinal axis of the aircraft, the rotor including a rotating mounting member having an air reacting surface, and an airfoil normally positioned substantially flat against the air reacting surface mounted on the mounting member for movement away from the air reacting surface during rotation of the rotor.

5. An aircraft including an air reacting rotor operatively mounted thereon for rotating about an axis extending laterally of the longitudinal axis of the aircraft, the rotor including a rotating mounting member having an air reacting surface, and an airfoil movably mounted on the mounting member for movement towards and away from the air reacting surface during rotation of the rotor, and power means for driving the rotor, power rotation of the rotor providing flying thrust for the aircraft.

6. An aircraft including an air reacting rotor operatively mounted thereon for rotating about an axis extending laterally of the longitudinal axis of the aircraft, the rotor including a rotating mounting member having an air reacting surface, and an airfoil movably mounted on the mounting member for movement towards and away from the air reacting surface during rotation of the rotor, power means for driving the rotor, power rotation of the rotor providing flying thrust for the aircraft, and a lifting airfoil located in the zone of action of the rotor.

7. An aircraft including an air reacting rotor operatively mounted thereon for rotating about an axis extending laterally of the longitudinal axis of the aircraft, the rotor including a rotating mounting member having an air reacting surface, and an airfoil operatively mounted on the mounting member for oscillating movement towards and away from the air reacting surface during rotation of the rotor.

8. An aircraft including an air reacting rotor operatively mounted thereon for rotating about an axis extending laterally of the longitudinal axis of the aircraft, the rotor including a rotating mounting member having an air reacting surface, and an airfoil operatively mounted on the mounting member for oscillating movement towards and away from the air reacting surface during rotation of the rotor, and power means for driving the rotor, power rotation of the rotor providing flying thrust for the aircraft.

9. An aircraft including an air reacting rotor operatively mounted thereon for rotating about an axis extending laterally of the longitudinal axis of the aircraft, the rotor including a rotating mounting member having an air reacting surface, and an airfoil operatively mounted on the mounting member for oscillating movement towards and away from the air reacting surface during rotation of the rotor, power means for driving the rotor, power rotation of the rotor providing flying thrust for the aircraft, and a lifting airfoil located in the zone of action of the rotor.

In testimony that I claim the above, I have hereunto subscribed my name.

WILLIAM C. MARTIN.